(12) United States Patent
Menon et al.

(10) Patent No.: US 11,875,482 B2
(45) Date of Patent: *Jan. 16, 2024

(54) LENSLESS IMAGING DEVICE (71) Applicant: University of Utah Research Foundation, Salt Lake City, UT (US)

(72) Inventors: Rajesh Menon, Salt Lake City, UT (US); Ganghun Kim, Salt Lake City, UT (US); Kyle Isaacson, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,645

(22) Filed: May 31, 2022

(65) Prior Publication Data

US 2022/0292648 A1 Sep. 15, 2022

Related U.S. Application Data

(63) Continuation of application No. 16/338,687, filed as application No. PCT/US2017/054728 on Oct. 2, 2017, now Pat. No. 11,373,278.

(Continued)

(51) Int. Cl.
*G06K 9/00* (2022.01)
*G06T 5/00* (2006.01)
(Continued)

(52) U.S. Cl.
CPC ............... *G06T 5/003* (2013.01); *G06T 5/50* (2013.01); *H04N 23/60* (2023.01); *H04N 23/811* (2023.01)

(58) Field of Classification Search
CPC .. H04N 13/239; H04N 5/2258; H04N 5/2251; H04N 5/372; H04N 5/374; H04N 5/23212; H04N 2209/048; H04N 5/217; H04N 23/60; H04N 23/811; G02B 7/28; G01S 17/89; G01S 17/86; G01S 7/4914; G01S 17/46; G01S 17/894; G01S 7/4814; G01S 7/4816; G01S 7/4863; G01S 7/4868; G01S 7/497; G01S 15/8915; G01S 15/8934; G01S 15/8979; G01S 15/899; G01S 17/10; G01S 17/34; G01S 17/42; G01S 7/003; G01S 7/4815; G01S 7/4817; G01S 7/4818; G01S 7/491; G01S 7/52023; G01S 7/52025; G01S 7/52026; G01S 7/52046; G01S 7/52053; G01S 7/52063;
(Continued)

(56) References Cited

U.S. PATENT DOCUMENTS 3,639,032 A * 2/1972 Haines ..................... G03H 1/34
359/30
6,292,525 B1 * 9/2001 Tam ......................... A61B 6/027
378/4

(Continued)

*Primary Examiner* — Shervin K Nakhjavan
(74) *Attorney, Agent, or Firm* — Thorpe North & Western, LLP.

(57) ABSTRACT

Technology is described for methods and systems for imaging an object (110). The method can include an image sensor (116) exposed to light (114) from an object (110) without passing the light through an image modification element. Light intensity of the light (114) can be stored as data in a medium. The image data can be analyzed at a processor (902) as a reconstructed image of the object (110).

24 Claims, 10 Drawing Sheets

Related U.S. Application Data (60) Provisional application No. 62/402,579, filed on Sep. 30, 2016.

(51) Int. Cl.
  *H04N 23/60* (2023.01)
  *H04N 23/81* (2023.01)
  *G06T 5/50* (2006.01)

(58) Field of Classification Search
  CPC ... G01S 7/52073; G01S 7/5208; G06T 5/003; G06T 5/50; G06T 2207/20084; B01L 2200/027
  See application file for complete search history.

(56) References Cited

U.S. PATENT DOCUMENTS

| | | | | |
|---|---|---|---|---|
| 8,043,003 B2* | 10/2011 | Vogt | | G01N 23/046 378/207 |
| 8,577,638 B1* | 11/2013 | Finley | | G06T 7/80 702/101 |
| 8,866,063 B2* | 10/2014 | Ozcan | | G02B 21/002 250/234 |
| 9,319,578 B2* | 4/2016 | Jiang | | H04N 23/80 |
| 11,272,098 B2* | 3/2022 | Ono | | H04N 23/957 |
| 11,689,813 B2* | 6/2023 | Taamazyan | | H04N 23/741 348/229.1 |
| 2004/0119104 A1* | 6/2004 | Szajewski | | H01L 27/14627 348/E3.018 |
| 2004/0128102 A1* | 7/2004 | Petty | | G01S 17/46 702/150 |
| 2006/0157640 A1* | 7/2006 | Perlman | | H04N 25/60 348/E5.079 |
| 2008/0001069 A1* | 1/2008 | Perlman | | H04N 25/60 348/E5.079 |
| 2008/0063139 A1* | 3/2008 | Pantsar | | A61B 6/14 378/40 |
| 2009/0021750 A1* | 1/2009 | Korner | | G06T 7/521 356/601 |
| 2009/0268045 A1* | 10/2009 | Sur | | H04N 23/72 348/222.1 |
| 2010/0066838 A1* | 3/2010 | Steckhan | | G06T 7/80 348/E17.002 |
| 2011/0157393 A1* | 6/2011 | Zomet | | H04N 1/04 348/241 |
| 2011/0234757 A1* | 9/2011 | Zheng | | G01N 15/1484 348/46 |
| 2012/0069209 A1* | 3/2012 | Gudlavalleti | | H04N 23/58 348/222.1 |
| 2012/0098950 A1* | 4/2012 | Zheng | | H04N 7/183 348/79 |
| 2013/0027516 A1* | 1/2013 | Hart | | A61B 5/0071 348/45 |
| 2013/0201297 A1* | 8/2013 | Jiang | | H04N 23/73 348/E5.04 |
| 2013/0201343 A1* | 8/2013 | Jiang | | H04N 23/55 348/222.1 |
| 2013/0222547 A1* | 8/2013 | Van Rooyen | | G02B 21/0004 438/57 |
| 2013/0280752 A1* | 10/2013 | Ozcan | | G01B 9/02041 356/482 |
| 2014/0112594 A1* | 4/2014 | Jiang | | H04N 23/80 382/255 |
| 2015/0118695 A1* | 4/2015 | Paek | | G01N 33/54373 435/7.1 |
| 2015/0204773 A1* | 7/2015 | Ozcan | | G03H 1/0443 382/103 |
| 2015/0219808 A1* | 8/2015 | Gill | | G02B 5/1842 348/335 |
| 2016/0041095 A1* | 2/2016 | Rothberg | | G01N 21/6452 506/4 |
| 2016/0069801 A1* | 3/2016 | Stevens | | H04N 23/54 348/135 |
| 2016/0305820 A1* | 10/2016 | Zollars | | G01J 3/0216 |
| 2017/0115201 A1* | 4/2017 | Reumers | | G03H 1/0465 |
| 2017/0322516 A1* | 11/2017 | Hsiao | | G03H 1/0866 |
| 2018/0035046 A1* | 2/2018 | Yuan | | H04N 23/54 |
| 2018/0195945 A1* | 7/2018 | Schneider | | G03H 1/0443 |
| 2018/0293762 A1* | 10/2018 | Fu | | G06T 11/003 |
| 2019/0137932 A1* | 5/2019 | Ozcan | | G03H 1/0465 |
| 2019/0195774 A1* | 6/2019 | El-Zehiry | | G03H 1/0443 |
| 2020/0014837 A1* | 1/2020 | Cioni | | G02B 21/06 |
| 2020/0033580 A1* | 1/2020 | Allier | | G02B 21/14 |
| 2020/0072728 A1* | 3/2020 | Perraut | | G01N 15/1434 |
| 2021/0041764 A1* | 2/2021 | Reshetouski | | G03B 17/17 |
| 2023/0105815 A1* | 4/2023 | Koehler | | G01N 23/041 378/62 |

\* cited by examiner

Reconstruction at Various Distances
400

LENSLESS IMAGING DEVICE

RELATED APPLICATIONS

This application is a continuation application of U.S. application Ser. No. 16/338,687, filed Apr. 1, 2019, which is a U.S. national stage application of PCT International Application No. PCT/US17/54728, filed Oct. 2, 2017, which claims the benefit of U.S. Provisional Application No. 62/402,579 filed on Sep. 30, 2016, entitled LENSLESS IMAGING DEVICE, which are each incorporated herein by reference.

GOVERNMENT INTEREST

This invention was made with government support under 1533611 awarded by the National Science Foundation. The government has certain rights in the invention.

BACKGROUND

Imaging devices, such as digital cameras or color cameras, can be used to capture images. The images can be still photographs or moving images, such as videos or movies. The imaging devices can operate using light within the visible spectrum or with other portions of the electromagnetic spectrum. Such imaging devices can use an image sensor to capture light and convert an optical image into an electronic signal that can then be stored or otherwise transmitted to construct an electronic image. Examples of image sensors can include charge-coupled devices (CCD) image sensors or complementary metal-oxide-semiconductor (CMOS) image sensors. Despite incredible advances in digital image sensors, imaging devices still rely on lenses to focus light onto the imaging sensor which adds expense and increases complexity of imaging systems.

SUMMARY

A method for imaging an object can include exposing an image sensor to light from an object. The light can be exposed onto the image sensor without passing the light through an image modification element. For example, the light may not be passed through a lens. The image sensor can typically be a complementary metal-oxide-semiconductor (CMOS). The image modification element may be a lens, an aperture, arrays of lenses or apertures, or the like but does not include dust covers, non-focusing layers or the like. In some cases, there are no physical elements between the image sensor and the imaged object. Dust particles, scratches, metal lines, imperfections, etc. on the image sensor itself can be advantageously used for computational imaging and accommodated in the present invention. Light intensity of the light detected at the image sensor can be stored as image data in a medium. The medium can be a computer usable storage medium and can be either volatile or non-volatile memory.

The image data can be reconstructed at a processor as a reconstructed image of the object. The reconstructed image can be an image, which is a representation of the image, which is suitable for human viewing as a reproduction of the imaged object. The reconstructed image may be described as an image in focus. Alternatively, the reconstructed image can be a selected pattern which is recognized from the raw image data via processing as described in more detail.

The imaging system can comprise an image sensor configured to be exposed to light from an object without passing the light through an overt image modification element. The imaging system can further comprise a medium configured to store light intensity patterns of the light as data. The imaging system can further comprise a processor configured to reconstruct the data at a processor as a reconstructed image of the object based on a reconstruction evaluation of the data combined with a space-variant point-spread function, and process the reconstructed image at the processor with binary thresholding to form an image of the object. The processor and medium can be physically coupled or connected to the image sensor or can be remotely located to the image sensor. The processor and medium can be wired or wirelessly connected to the image sensor. The image sensor can be covered with a coating to physically protect the image sensor where the coating is transparent to the light that the image sensor is exposed to.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

In describing and claiming the present invention, the following terminology will be used.

The singular forms "a," "an," and "the" include plural referents unless the context clearly dictates otherwise. Thus, for example, reference to "a pixel" includes reference to one or more of such features and reference to "directing" refers to one or more such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 5%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Lensless Imaging Devices

Methods and systems are disclosed for imaging with an imaging sensor without passing the light through an image modification element. This can be used in new form factors for cameras. For example, the present technology can be described as a lensless imaging device that does not use a lens or other image modification element to focus the light exposed onto the imaging sensor. The imaging sensor can be a complementary metal-oxide-semiconductor (CMOS), semiconductor charge coupled device (CCD), n-type metal oxide semiconductor (NMOS), flat panel detectors, sCMOS, emCCD, CIS, back-side illuminated sensors, organic sensors, quantum-dot based sensors, any pixel-based image recording device, or other imaging sensor. In one example, the present technology relies on the space variant point-spread functions resulting from the interaction of a point source in the field of view of the image sensor. These space-variant point-spread functions are combined with a reconstruction evaluation in order to image simple objects displayed on a discrete light emitting diode (LED) array. In one example, the approach is extended to video imaging at the native frame rate of the image sensor. In another example, experiments to analyze the parametric impact of the object distance were performed.

In one example, the image sensor or imaging sensor is exposed to light without passing the light through an image modification element. The excluded image modification element may be described as a lens, an aperture, a diffractive grating, a mask, a filter, or another element designed to filter, focus, or otherwise adjust, the focal point of light on the image sensor. In one example, the image sensor can be covered with a transparent layer that is designed to protect the image sensor from weather, moisture, dust, dirt, debris, physical contact with other objects, etc. The transparent layer may also be described as a coating, cover glass, or a dust cover. In some cases, a transparent passivation layer can also be included. The optional passivation layer can be any coating material which reduces oxidation, corrosion or chemical degradation of the underlying sensor. While these transparent layers are transparent to the light that the image sensor is exposed to, the transparent layer does not act on the light as a lens to filter, focus, or adjust the focal point of the light such that it is not an image modification element. The transparent layer also does not act on the light as an aperture in the way the aperture of a pin hole camera focuses the light. The present technology can be employed to build a camera without image modification elements that may be described as a lensless camera or lensless imaging device. The lensless camera can be lighter, cheaper, and smaller than a camera with image modification elements.

The optical systems of cameras in devices such as mobile devices typically constrain the overall thickness of the devices. By eliminating the image modification elements or the optics, it is possible to create ultra-thin cameras with interesting new form factors. In some examples, computational photography has eliminated the need for lenses by utilizing apertures in front of the image sensor or via coherent illumination of the sample. In the former case, although apertures have replaced the lenses, the thickness of the camera has not been reduced. The apertures create shadow patterns on the sensor that can be computationally recovered by solving a linear inverse problem. The latter case uses coherent illumination, which is not applicable to general photography. Another computational camera utilizes a microlens array to form a large number of partial images of the scene, which is then numerically combined to form a single image with computational refocusing. The present technology includes a computational camera that is comprised of only the image sensor and no other optical elements which form or focus an image onto the sensor, although scatterers can optionally be used to enhance image reconstruction efficiency.

The present technology is based upon the recognition that all cameras essentially rely on the fact that the information about the object enters the aperture of the lens, the coded aperture or micro-lens array, and is recorded by the image sensor. In the case of the coded aperture and the microlens array, numerical processing is performed to represent the image for human consumption. If all optical elements are eliminated, the information from the object is still recorded by the image sensor. The present technology has developed reconstruction evaluations applied to the image recorded by the sensor that is employed to recover the image for human consumption.

In one example, the image sensor, the reconstruction evaluation, and the binary thresholding can make use of one hundred percent of the photons exposed to the image sensor for the reconstructed image. The present technology does not require a light source such as a flash or a special light source to capture or generate data at the image sensor.

For example, the image data can be reconstructed based on a reconstruction evaluation of the image data combined with a space-variant point-spread function. The reconstructed image can optionally be processed at the processor with binary thresholding to form an image of the object. The image can be a still image or a video. The image may also be two-dimensional or three-dimensional. In one specific example, the reconstruction can be accomplished using a space-variant point-spread function. For example, in practice, image sensors are equipped with a transparent protective glass cover. With no other optics, the protective glass can be the sole optical medium that stands between the light sensing element and the outside world. When light arrives at an interface, five basic processes may occur: absorption, refraction, reflection, diffraction, and scattering. If the glass layer is perfectly flat, clean and free of defects, light will only partially reflect at the air-glass interface. However in real devices, especially once the image sensor is taken out of casing, the protective glass will have some defects and imperfections. As a result, light entering the sensor will undergo combinations of light-matter interactions including diffraction, scattering, and refractions resulting in space-variant point-spread functions (SV-PSFs). If carefully calibrated, these SV-PSFs can be used in conjunction with matrix inversion algorithms to turn an image sensor into an imaging device.

To calibrate the SV-PSFs, a 32×32 LED array can be oriented in front of the sensor and turn on one LED at a time, while recording the resulting frame on the sensor. Each frame is concatenated to form a calibration matrix, A. A general object, x can then be approximated as b=Ax, where b is the sensor data. One example experimental calibration matrix, A exhibited a condition number of 10,912, which is the upper bound of the ratio between input change and output change, which is defined below.

$$\kappa(A) = \max\left(\frac{\|A^{-1}e\|/\|A^{-1}b\|}{\|e\|/\|e\|}\right) = \frac{\sigma_{max}}{\sigma_{min}},$$

where κ is the condition number and σ denotes a singular value. Such a large condition number suggests that the inverse problem is ill-posed. Hence, we solve a regularized linear inverse problem to recover the object, x from the sensor data, b as:

$$\hat{x} = \mathrm{argmin}\|Ax-b\|_2^2 + \alpha^2\|x\|_2^2,$$

where argmin refers to the L2 minimization. The regularization parameter, α controls noise suppression and the smoothness of the solution, x. Regularization provides robust reconstruction capability that can withstand reasonable level of noise. Alternative regularization methods can also be employed to improve the results and a brief discussion is provided later.

In addition, a simple numerical model can be formed using the above formulation. The relative luminous intensity of each LED can be used to simulate each point source. The image sensor measures the intensity profile of the source projected onto the sensor, which can be calculated given the angle between the point source and the sensor pixels. In one example, a 32×32 LED array both as an array of point sources during calibration and also to form simple objects for reconstruction. Therefore, we simulated the calibration matrix, A as the intensity on the sensor from each of the LED point sources. If no imperfections are assumed, then the condition number of A becomes very large (~186 million) and image reconstruction is not possible. Thus, the effect of imperfections can be created by adding space-varying terms (norm value of 1/325 of background) to each frame in A so as to approximately match an experimentally obtained condition number (11,035 in one example).

The field of view is limited by the acceptance angle of the sensor, defined approximately as $\tan^{-1}(h/D)$, where h is the vertical distance from the optical axis to the edge of the field, and D is the distance from the sensor to the object plane. In other words, the closer the sensor is to the object, the smaller the field of view.

In one example, the reconstruction evaluation employs a calibration matrix. The calibration matrix can be generated to calibrate the data from the image sensor for use with the reconstruction evaluation. A different calibration matrix can be employed to account for distance between the object and the image sensor. The number of calibration matrices can determine resolution achieved. For example, four calibration matrices over a distance of 50 meters can generally provide lower resolution reconstruction than ten calibration matrices over the same distance. As a general guideline, from one to twenty distance based calibration matrices can be used, and in many cases more than one calibration matrix can be used. Similarly, the calibration matrix can be formed using information across wavelengths (e.g. for color or multispectral images including IR, UV, etc). Introducing additional wavelengths can create a larger calibration matrix (or matrices), increase computational time, etc but can also increase resolution and reconstructed image information. Furthermore, in many cases the calibration can be done using constant light intensity as a point source which provides reasonable results. However, as the point source moves relative to the sensor, the total signal received can change. Thus, in some cases, the point source light intensity can also be varied to account for the dynamic light intensity range of the sensor.

In one example, the space-variant point-spread function results from an interaction of a point source at the object in a field of view of the image sensor.

In one specific example, the image sensor is exposed between 10 ms and 100 ms to the light from the object. In one specific example, about 100 frames of the light is stored.

In one example, the reconstruction evaluation images lines in vertical, horizontal, and diagonal orientations. The reconstruction evaluation may employ the lines in vertical, horizontal, and diagonal orientations to reconstruct the image for human consumption.

Furthermore, reconstruction methods can encompass any techniques used to solve linear and non-linear inverse problems. In general, the sensor-based imaging system is linear such that the image of a general scene can be treated as the linear combination of the images formed by point sources that make up that scene. The decomposition of a scene into point sources can occur in space (2D or 3D) and/or in wavelength, polarization, mode, coherence, etc. In some cases, the sensor itself may introduce nonlinearities. In other cases, the medium between the scene and the sensor may introduce nonlinearities. In these cases, the inverse problem can become nonlinear as well. Reconstruction methods include, but are not limited to, matrix inversion, regularized matrix inversion, error minimization, least-squares method, sparse methods, regression techniques, iterative error minimization, iterative techniques, back-propagation techniques, algebraic techniques, optimal estimation, optimization techniques, etc. Regularization techniques that can be incorporated into reconstruction includes, but is not limited to, Tikhonov, Tikhonov with least squares, total variation, sparse regularizers, nuclear norm, mean constrained, clustered-mean constrained, graph-based, etc.

In another alternative, the raw image data can be analyzed by applying deep learning on the image data such that the reconstructed image is a pattern recognition of an image characteristic of the image. For example, the characteristic can be an image classification (e.g. a person, a face, an animal, facial recognition, iris recognition, or the like). Alternatively, the characteristic can refer to objects of a specific color, specific shape, objects that run, objects that roll, roadsigns, whether an object is moving or stationary, etc. Any suitable deep learning technique can be applied and in one example can be a convolutional neural network. Other non-limiting examples can include recursive neural networks, deep belief networks, deep stacking networks, neural history compressors, and the like.

Such deep learning approaches can allow identification of the image characteristic such as, but not limited to, color, facial recognition, motion, and shape. For example, the analysis can identify a color change of a traffic light to green or red. Other examples can include, but certainly not limited to, facial recognition, facial expressions, relative motion of objects, obstacles, and the like.

In one example, a surface of the image sensor is engineered with scatterers. The scatterers may be used to enhance the reconstruction of images captured by the image sensors without image modification elements. The scatterers can be dust particles, scratches on the cover glass or passivation layer, metal lines on the sensor, mirrors on the cover glass and/or sensor surface, imperfections, etc. and anything that can spatially modify the point-spread function across the sensor surface. The scatterers can generally be non-continuous across the surface having discrete features (e.g. as opposed to continuous lenses). As a general rule, almost any discontinuous or quasi-random pattern can work, as well as engineered scatterer distributions based on specific applications.

The medium for the storing the light can be local or remote to the image sensor. For example, the medium can be physically connected to the image sensor. Alternatively, the medium may be located remotely in a cloud based computing structure or separate data processing unit. The reconstructing the data and the processing the reconstructed image may occur immediately after the data has been generated or may be later in time. For example, the data may be captured and then sent to a remote location for processing. Alternatively, a plurality of data for several different images may be generated before any of the data is processed to reconstruct the image.

In one example, the raw image data can be utilized within a machine learning technique as previously described. Machine learning techniques may also be described as deep learning or artificial intelligence. For example, the system can input the images into the machine learning algorithms in order to form output, make decisions, or otherwise guide a system. This technology can be useful in a wide variety of settings including, but certainly not limited to, motion sensors, self-driving vehicles, facial recognition, security, scientific imaging, action cameras, and other technologies.

The present technology can have many different applications in use. For example, a lenless imaging device may be used for biometrics such as facial recognition and fingerprinting. The present technology may also be useful in applications such as driverless cars and robotic sensors.

Example

Figure 1A:
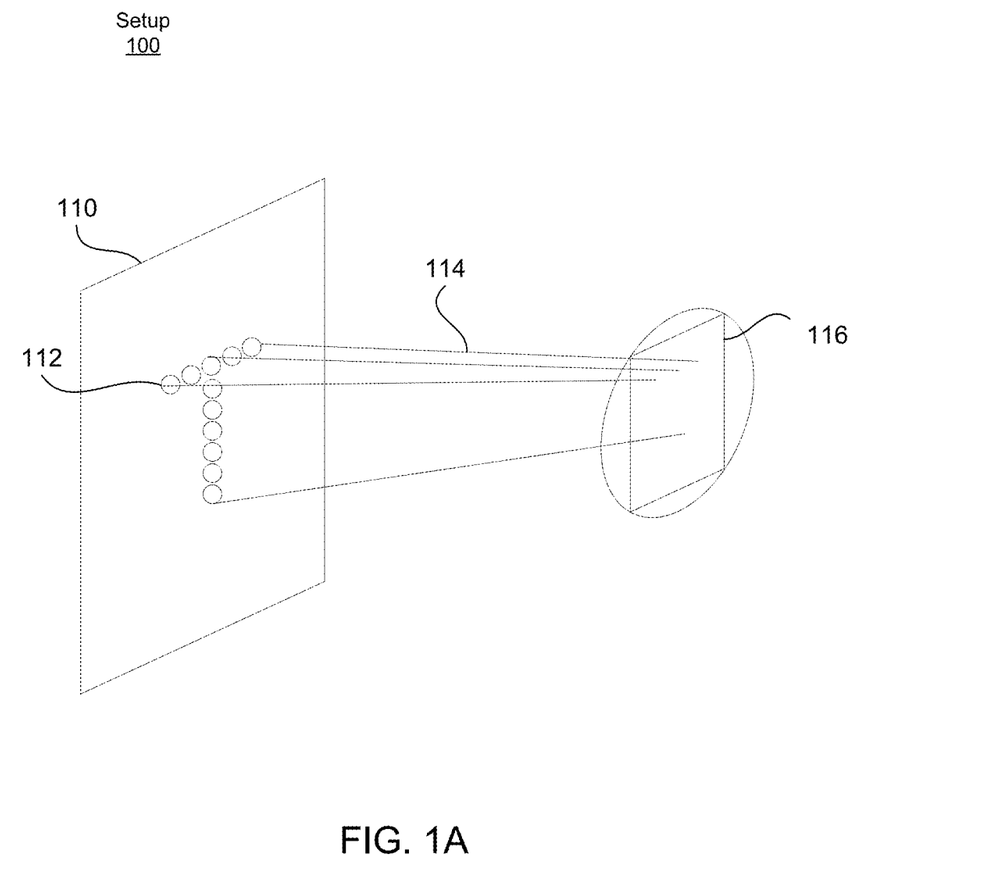
FIG. 1A illustrates a setup of an image sensor and an object, in accordance with examples of the present disclosure.

FIG. 1A is a block diagram of a setup 100 of an environment for an imaging system in accordance with embodiments of the present technology. The setup 100 comprises an object 110. The object 110 can be any type of object to be imaged. The object 110 can be an LED matrix set in front of an image sensor 116. For example, the lights 112 may be LED lights in the LED matrix that have been turned on and are emitting light 114. The light 114 is exposed onto the image sensor 116 without passing the light 114 through an image modification device such as a lens. The image sensor 116 then generates image data based on the light 114. The image data can be described as raw image data that is not focused. A display of the image data may depict an image that is not in focus or recognizable as the object 110.

Figure 1B:
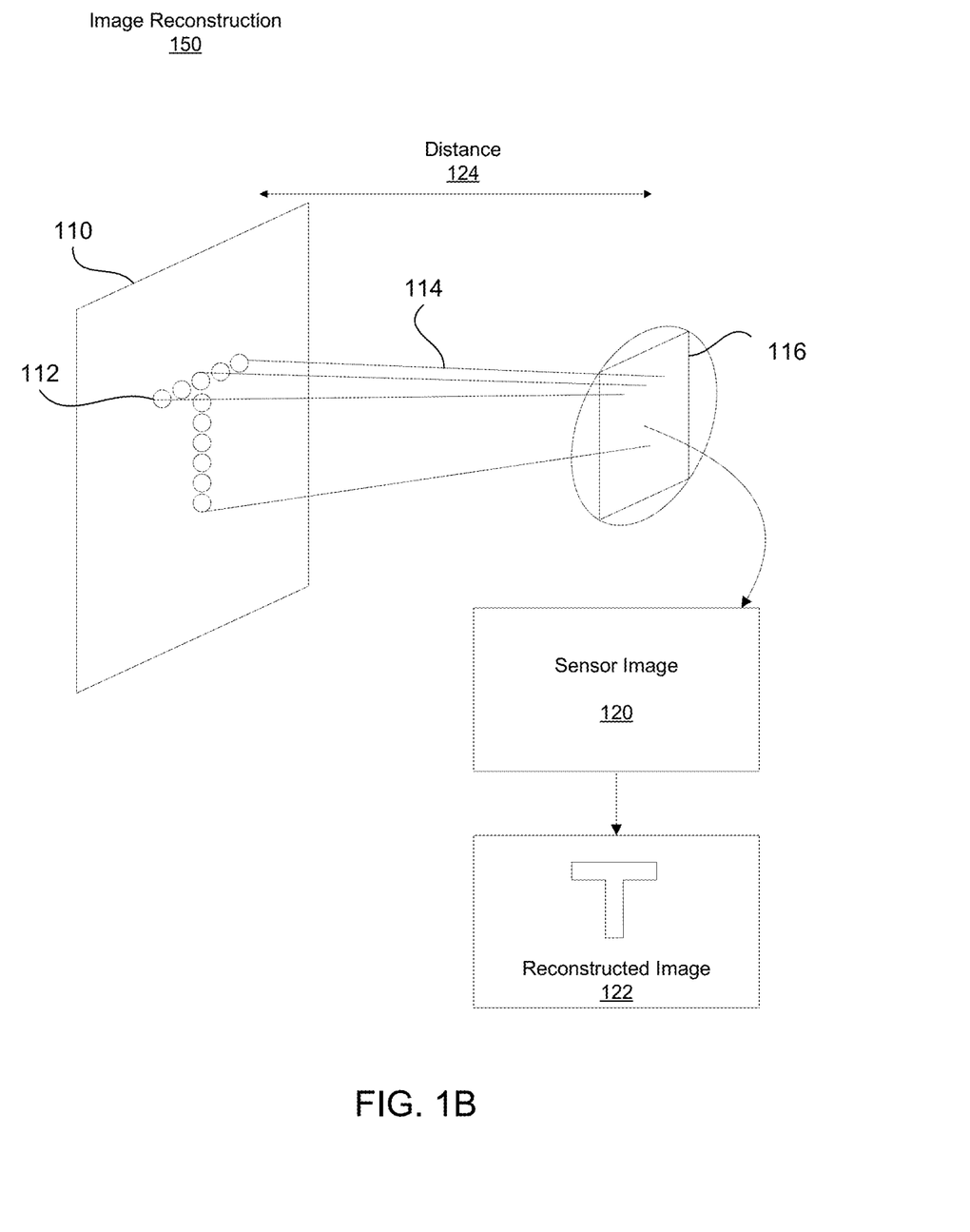
FIG. 1B illustrates a setup of an image sensor and an object used to generated a reconstructed image, in accordance with examples of the present disclosure.

The light 114 may pass through a layer such as a dust cover. Such a layer may be designed to protect the image sensor 116 from moisture, weather, physical shock, and other environmental factors. The layer can be transparent and is not designed to focus the light 114 onto the image sensor 116. FIG. 1B is a block diagram of an image reconstruction 150. FIG. 1B depicts the object 110 with the lights 112 emitting the light 114. FIG. 1B also depicts the image sensor 116. FIG. 1B depicts the lights 112 forming a simple T-shaped pattern displayed on the object 110 which can be an LED matrix. The image sensor 116 can be employed to capture an image or image data of the object 110. The image data can then be used as input into a recovery evaluation to reconstruct a scene object 110 as the subject.

In one specific example, the object 110 is depicted as a 32×32 RGB LED matrix panel (SparkFun, COM-12584) controlled via an Arduino board. The LEDs are uniformly spaced with a gap of 6.1 mm. The total matrix size is 19 cm×19 cm. The image sensor 116 is depicted as the commercially available CMOS color sensor (DFM 22BUC03-LM, Imaging Source). However, any suitable image sensor can be used such as, but not limited to, CCD, CMOS, sCMOS, emCCD, CIS, backside illuminated, quantum sensor, or anything that can record the intensity and/or phase of light. In one embodiment, the image sensor 116 has 640×480 pixels, each of which is a 6 µm square. The maximum supported frame rate of the camera via a USB 2.0 interface is 76 frames per second. In one example, the image sensor 116 was placed at a distance 124, D from the object 110. This may be referred to as the propagation distance that the light 114 travels before impinging upon the image sensor 116.

The refresh rate of the LED array can be 16 Hz. Frame averaging can be used to eliminate the effect of this refresh rate as well as to enhance the signal to noise ratio of the raw data.

The image data generated by the image sensor 116 can be described as sensor image 120 and may be stored in a medium associated with the image sensor 116. The medium can be capable of storing digital data and can be associated with a processor for processing the data. The sensor image may be displayed as an image of the object 110, but the image may not be recognizable as the object 110 because the image data is raw and unfocused. The sensor image 120 may be operated upon to generate a reconstructed image 122. For example, a processor may be used to analyze or reconstruct the image data from the sensor image 120 using the techniques of the present technology. The reconstructed image 122 depicts a T-shape pattern which is a recognizable image of the T-shaped pattern displayed by the lights 112 of the object 110.

Figure 2:
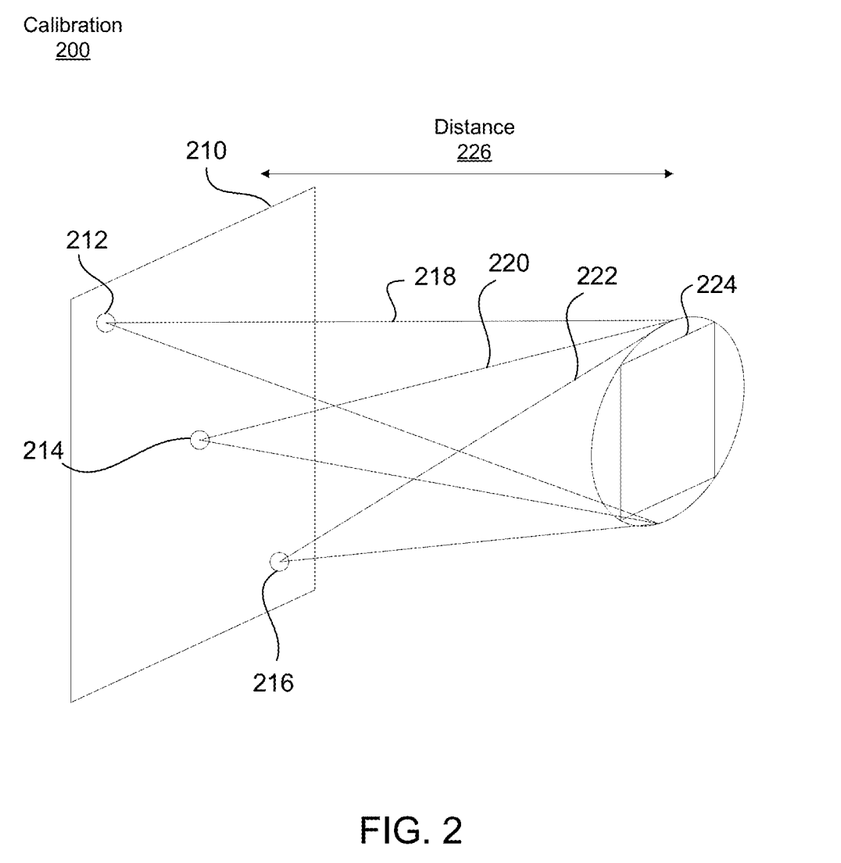
FIG. 2 illustrates a calibration of sensor images in accordance with examples of the present disclosure.

FIG. 2 is a schematic illustration of a calibration 200 of sensor images or image data related to an object. FIG. 2 depicts an object 210 and an image sensor 224 which can have the same features and capabilities of the object 110 and the image sensor 116 of FIGS. 1A and 1B. The calibration 200 can be a calibration process that is used to calibrate the image data generated by the image sensor 224. The calibration can occur before an image is reconstructed using the techniques of the present technology. Furthermore, the calibration can also be varied across wavelengths to obtain multispectral imaging.

In one example, the object 210 may be a test LED matrix such as a 16×16 matrix of LED lights. FIG. 2 depicts the object 210 with lights 212, 214, and 216 turned on or emitting light. For example, the lights 212, 214, and 216 emit light 218, 220, and 222 respectively. The light 218, 220, and 222 is exposed onto or impinges on the image sensor 224. The light 218, 220, and 222 can be recorded separately. Lights 212, 214, and 216 can ne described as point sources for the light 218, 220, and 222 which expands as the distance from the object 210 increases. The image sensor 224 can be separated from the object 210 by distance 226.

The imaging system can be calibrated by recording the image of each light source that is emitting light in the array on object 210, forming the calibration matrix, A. The calibration matrix can be the same for the same image sensor. If the sensor characteristics of the image sensor 224 change, then a new calibration may be done. If a second sensor is the same model with common specifications as compared to the image sensor 224, then the calibration matrix may also be the same for the second sensor. In one example, 100 frames were averaged for each light 218, 220, and 222. During calibration, extraneous light may be minimized. When an arbitrary pattern is displayed on the LED matrix, the resulting sensor image is a linear combination of the images formed by the individual LEDs (elements of the calibration matrix, A). The system can be described as Equation 1:

$$b=Ax \quad (1)$$

where x is the object, and b is the sensor image. Hence, a regularized linear inverse problem can be solved to recover the object x from the sensor data b, as formulated in Equation 2:

$$\hat{x} = \underset{x}{\operatorname{argmin}} \|Ax - b\|_2^2 + \alpha^2 \|x\|_2^2 \quad (2)$$

where argmin refers to the L2 minimization. The regularization parameter, a controls noise suppression and the smoothness of the solution, x. Notably, the inverse problem can also be solved using other technique such as, but not limited to, direct-binary search, genetic algorithms, particle-swarm algorithm, linear algebra, and combinations of various algorithms to solve this problem.

An LED matrix of the object 210 may have only one color of LEDs for calibrating. However, the technique is easily extended to all colors. During calibration, exposure time may be between 10 ms and 100 ms to ensure that the sensor pixels on the image sensor 224 are not saturated. For each image, 100 frames may be averaged.

Figure 3:
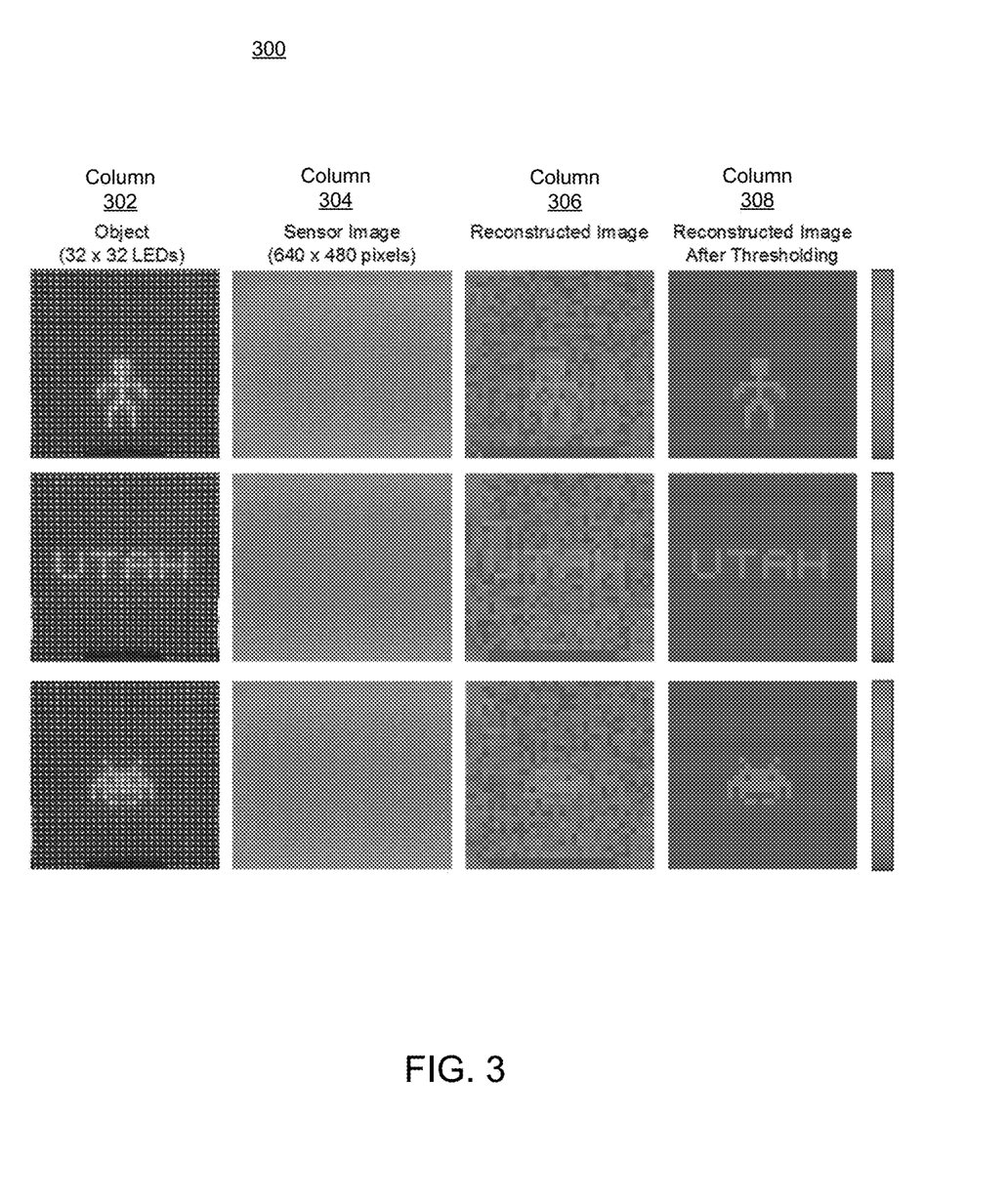
FIG. 3 illustrates a chart depicting images of additional objects in accordance with examples of the present disclosure.

FIG. 3 illustrating a chart 300 depicting objects that have image data captured by an imaging sensor. Column 302 depicts objects patterns that are displayed using an LED matrix array. Column 304 depicts raw sensor images which is the unfocused data collected or generated by the image sensor from light emitted by the objects in column 302. Column 306 depicts a reconstructed image using techniques of the present technology applied to the image data that is depicted in column 304. The reconstructed images in column 306 may be recognizable as an image or depiction of the objects in column 302. Column 308 depicts reconstructed images after thresholding techniques are applied to the images in column 306. The thresholding techniques are employed to further focus image of the object.

In one example, using these techniques, video imaging can be performed. The reconstruction process, including all necessary image processing, can take less than 10 ms per frame using a standard desktop computing system (e.g. PC Intel Core i7-4790, 32 GB memory). In one example, the frame rate was limited by averaging of 100 frames, which can take 1 to 10 seconds.

The distance D that the object is from the image sensor may be a parameter that affects performance. Therefore, a systematic analysis can be performed by repeating the calibration at various values for D (85 mm, 165 mm, 242 mm, 343 mm and 497 mm). For each value of D, a separate calibration can be performed and used to update the matrix, A accordingly.

In one example, the field of view was estimated by determining the largest object that could be reconstructed. Objects with up to 32 LEDs in the horizontal direction and 30 LEDs in the vertical direction can be recovered. In one example, the only post-processing methods applied may be binary thresholding, and the use of the regularization parameter, a.

Figure 4:
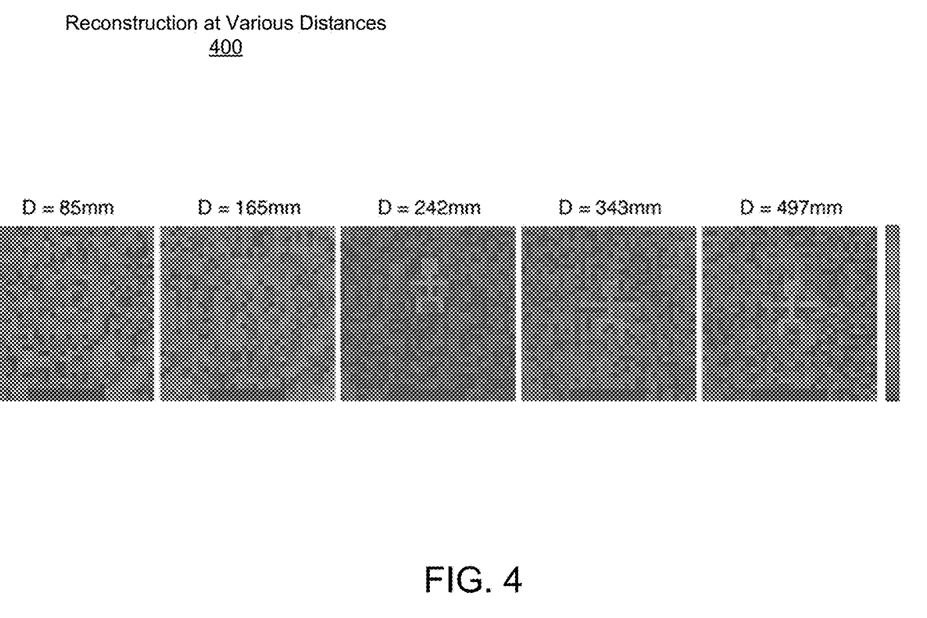
FIG. 4 illustrates reconstructions of images at various distances in accordance with examples of the present disclosure.

FIG. 4 illustrates reconstruction at various distances 400. The reconstructed images obtained at various distances, D. For example, FIG. 4 depicts five distances of the object at 85 mm, 165 mm, 242 mm, 343 mm, and 497 mm. The same object was imaged and reconstructed at the five distances, and the reconstruction results (with no post-processing) are shown in FIG. 4. Enhancement in LED discrimination may be a function of increasing distance and can be used to improve image reconstruction. For the largest value of D, it was observed that the quality of the reconstruction decreased slightly. The decrease in quality may be due to the reduction of signal to noise ratio in the recorded image.

Figure 5:
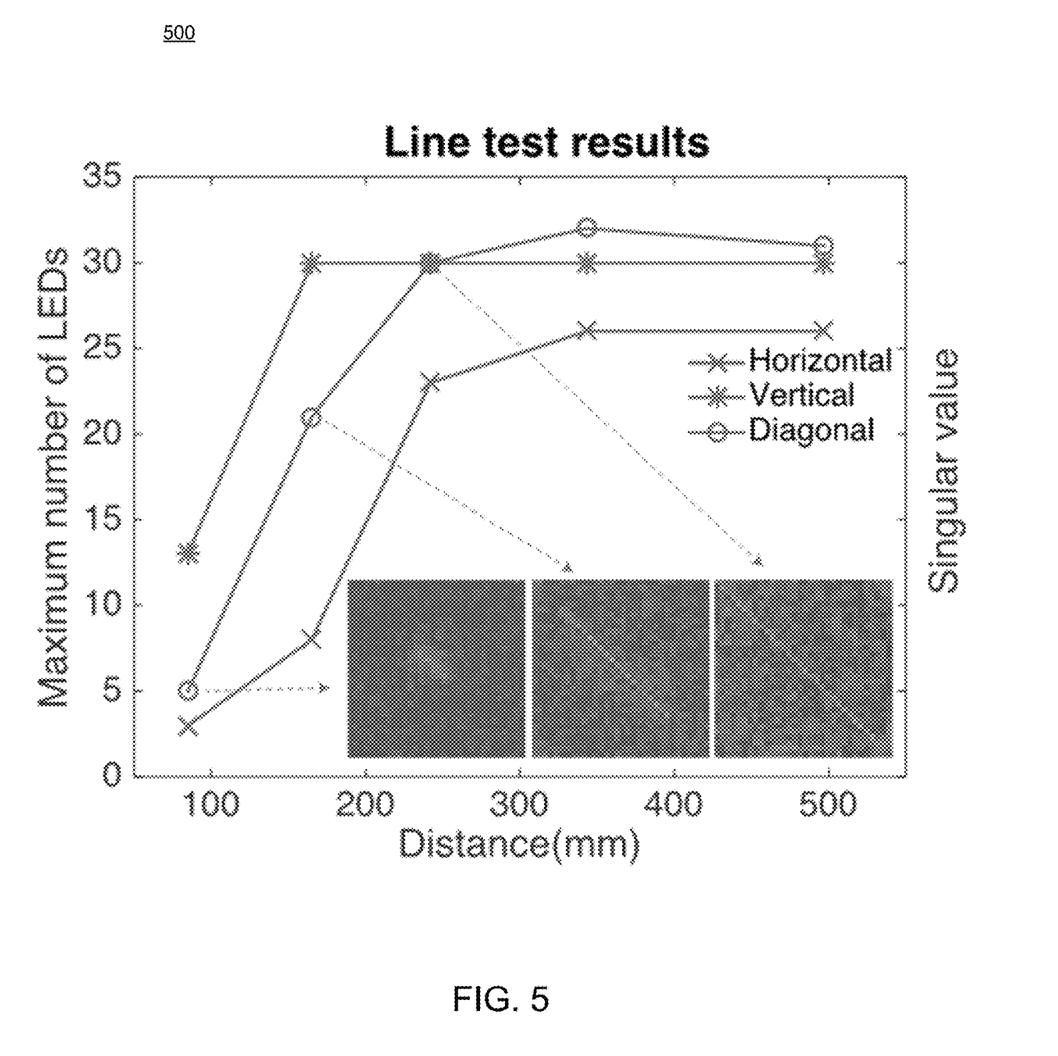
FIG. 5 illustrates line test results in accordance with examples of the present disclosure.

FIG. 5 illustrates line test results 500 where length of a line object was imaged at various distances, D in the horizontal, vertical and diagonal directions. Insets show reconstructed images of diagonal lines captured at the D=85, 162, and 242 mm. The imaged lines were oriented in the vertical, horizontal, and diagonal directions at the various sensor-matrix distances to access the effect of distance on the field of view and reconstruction quality. The results are summarized in FIG. 5. Reconstruction of vertical lines was less than those of the horizontal lines at all distances. FIG. 5 depicts all LEDs in the matrix for the object being captured were easily reconstructed in the vertical direction at all distances. Not all LEDs were reconstructed properly in the horizontal direction. This asymmetry is attributed to the geometry of the sensor used to generate the data for FIG. 5. The sensor used to generate FIG. 5 had 640 pixels in the vertical direction compared to 480 in the horizontal direction. Longer diagonal lines were reconstructed at larger values of D as indicated by the inset images in FIG. 5.

Figure 6:
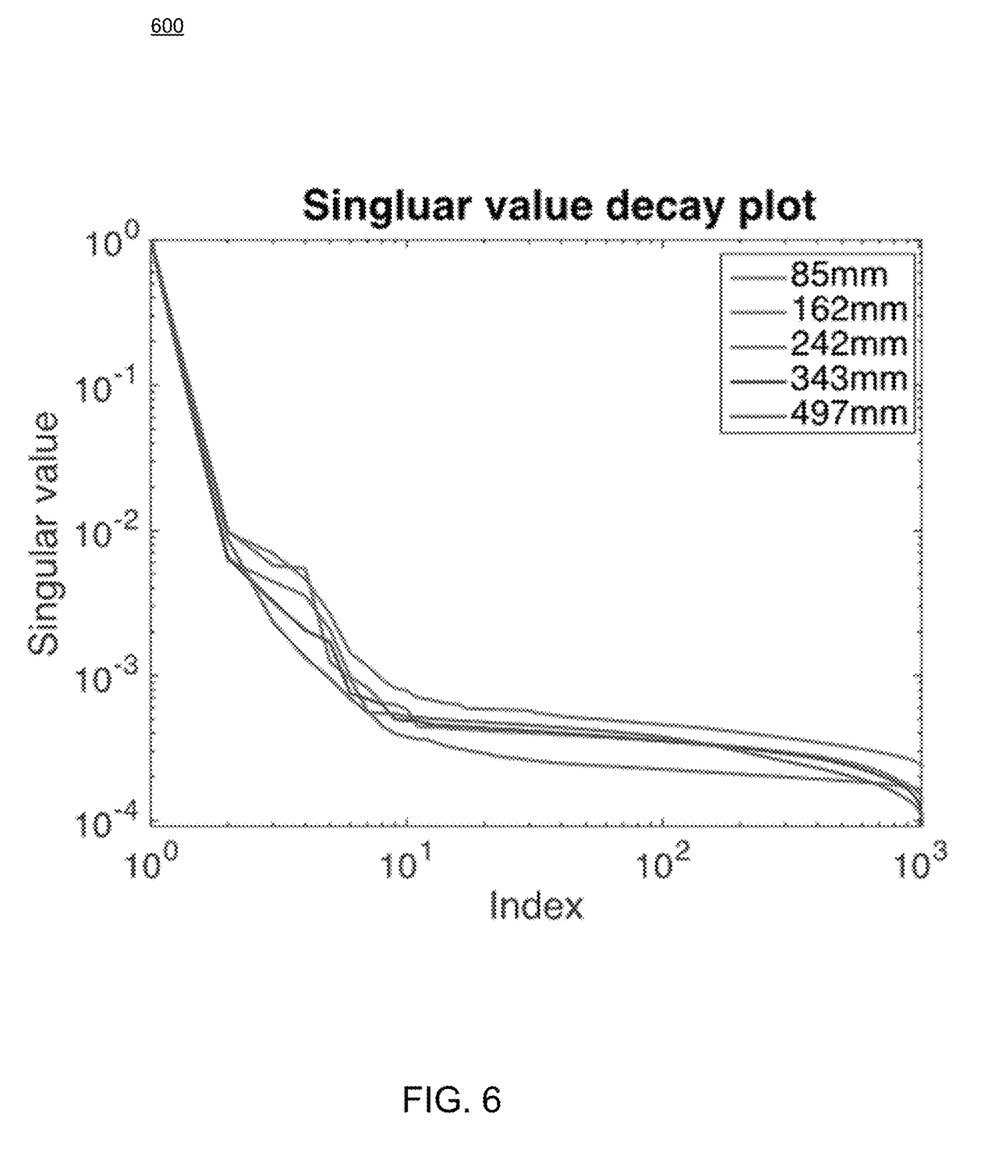
FIG. 6 illustrates a singular-value-decay plot of the calibration matrix in accordance with examples of the present disclosure.

FIG. 6 illustrates a singular-value-decay plot 600 of the calibration matrix, A captured at various values of D. The singular-value-decay plot was generated for the calibration matrix, A at each value of D. This plot is an indication of how ill-posed the inverse problem is. Note that the singular-value-decay plot is computed from the same calibration dataset used to reconstruct the images. This plot shown in FIG. 6 shows that at D=85 mm, the singular values decay most quickly.

Figure 7:
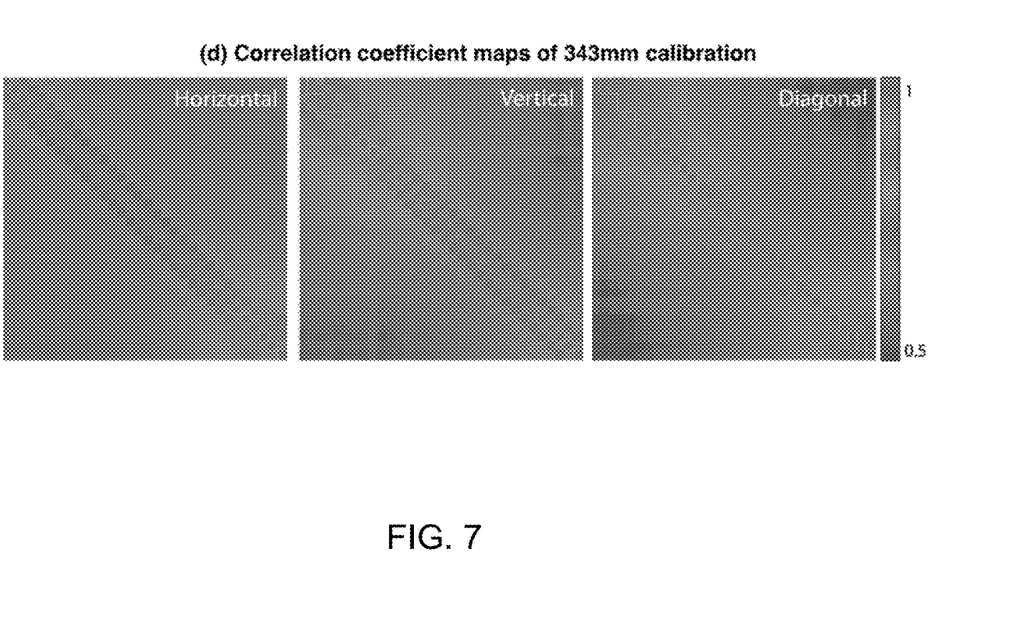
FIG. 7 illustrates coefficient maps with the correlation matrix in accordance with examples of the present disclosure.

FIG. 7 illustrates coefficient maps with the correlation matrix among the calibration images for D=343 mm along the horizontal, vertical and diagonal directions. Another way to estimate the difficulty of image reconstruction is by analyzing the correlation coefficient map. Each element in the correlation matrix is the Paterson correlation coefficient between two calibration images, indicated by the vertical and horizontal indices. The horizontal matrix is created using a set of 32 LEDs along the horizontal line in the center. Vertical and diagonal matrices are created in the same manner. The correlation values of two sampled calibration images in any direction are always notably lower than 1, indicating that no two images within the calibration database are closely resembling each other. In addition to providing an insight as to how the reconstruction performs at varying D, the aforementioned analysis implies the possibilities for computational refocusing and reconstruction of 3D information. Given the collection of calibration database at multiple object distances, the same linear decomposition process used here can be applied to uncover the 3D spatial information of the scene.

Figure 8:
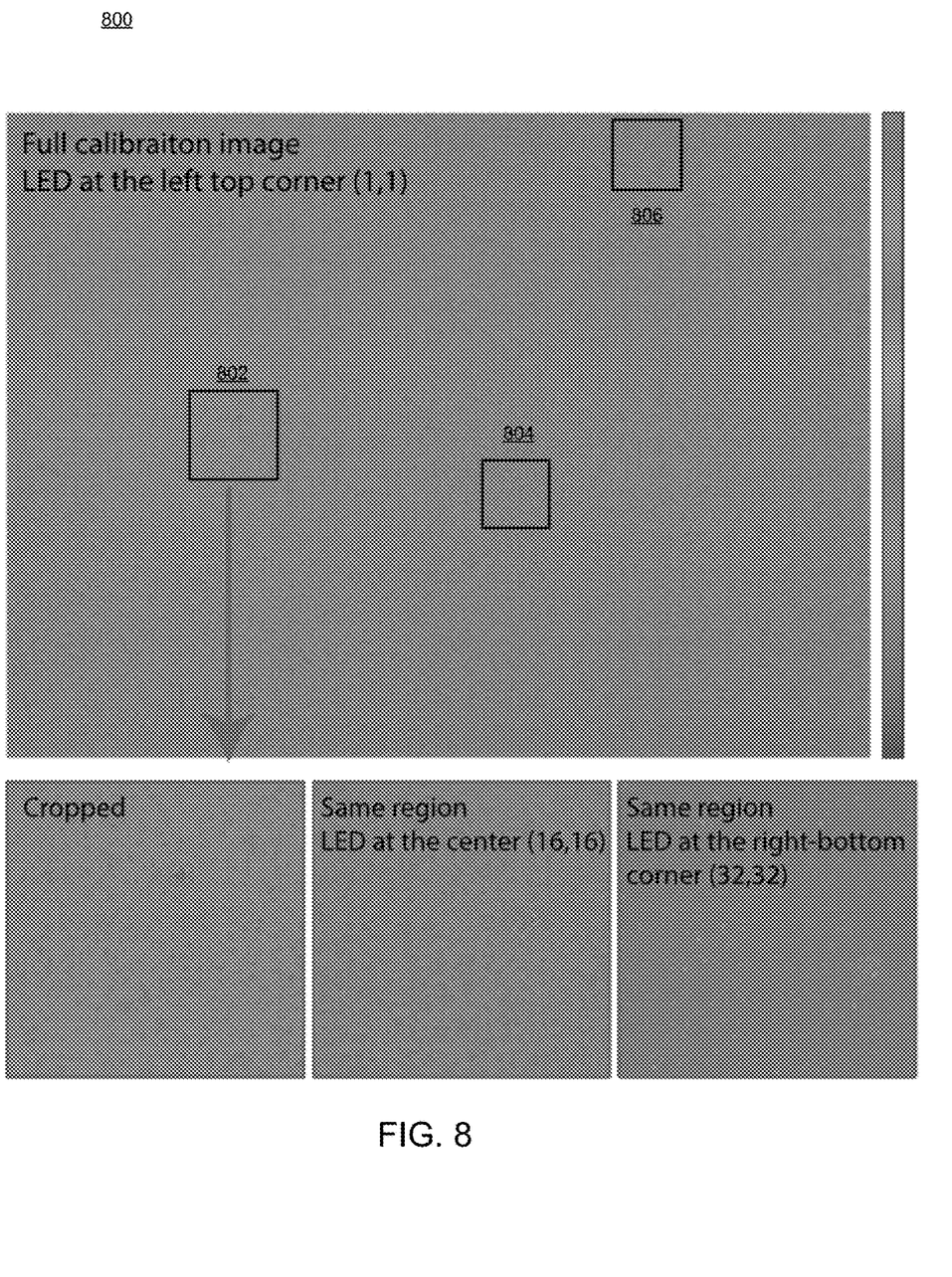
FIG. 8 illustrates calibration images in accordance with examples of the present disclosure.

FIG. 8 illustrates images 800 including a detailed image of one LED located at the top-left corner which shows three defects on the sensor. The defects may be due to dust particles. The defects are indicated by square outlines 802, 804, and 806. The region marked with the square outline 802 is shown in the bottom for different LEDs, clearly indicating a shift of the "defect" pattern.

For different locations of LED to be discerned by the computational process, there may be a distinct feature in the image that uniquely differentiates each calibration image from another. In this experiment, locations on the sensor were observed where a small dust particle is casting a shadow onto the sensor. Therefore, the intensity pattern on the sensor shifts with the location of the LED. In FIG. 8, one element of the calibration matrix (the image of one LED at the top-left corner of the LED matrix) is shown. In this frame, several patterns were likely created by dust particles (indicated by the square outlines). Observing the region denoted by the red square for various such frames, it can be seen that the pattern shifts with the position of the LED in the matrix (bottom row). The image reconstruction appears to be successful because of a combination of such random patterns that are inherent on the CMOS sensor and the variation of intensity introduced by the different optical path lengths followed by light from the different LEDs to the sensor. It is important to note that scatterers can be directly engineered onto the sensor to enhance such reconstructions in the future. Such techniques can be extended to non-imaging computational problems including inference using deep learning and related evaluations.

Deep learning may also be described as machine learning or artificial intelligence where pattern recognition and other techniques are used by a computer system to make decisions. Non-limiting examples of deep learning techniques can include convolutional neural networks, Bayesian techniques, Gaussian process regression, and the like. For example, with deep learning, the images do not need to be reconstructed, but deep learning algorithms can be applied directly onto the raw sensor data to make intelligent decisions. For example, by looking at the raw data, an algorithm can distinguish the color of a traffic signal. Thus, the raw sensor data can be directly processed using these complex algorithms for decision making. This approach can also save computational time and power consumption compared to processing images from normal cameras. The present technology may be described as a lensless imaging device. The lensless imaging device may be combined with deep learning to perform functions or operations such as facial recognition, motion detection, biometrics, a self-driving car, machine vision, etc. The lensless camera may be combined with other technologies such as a robot or a vehicle.

The present technology demonstrates that lensless photography is possible with only an image sensor. This is achieved via the numerical solution of an inverse problem assuming incoherence of the object and linearity of the image-formation process. The technique is applied to both still-frame and video imaging. By calibrating the system at various planes (e.g. distances from the sensor), it is shown that it is possible to numerically refocus and achieve quasi-3D imaging as well. In other words, the only-sensor camera is always in focus (within limits of SNR). The technique is readily extended to color imaging by replacing the monochromatic sensor with a color sensor.

Figure 9:
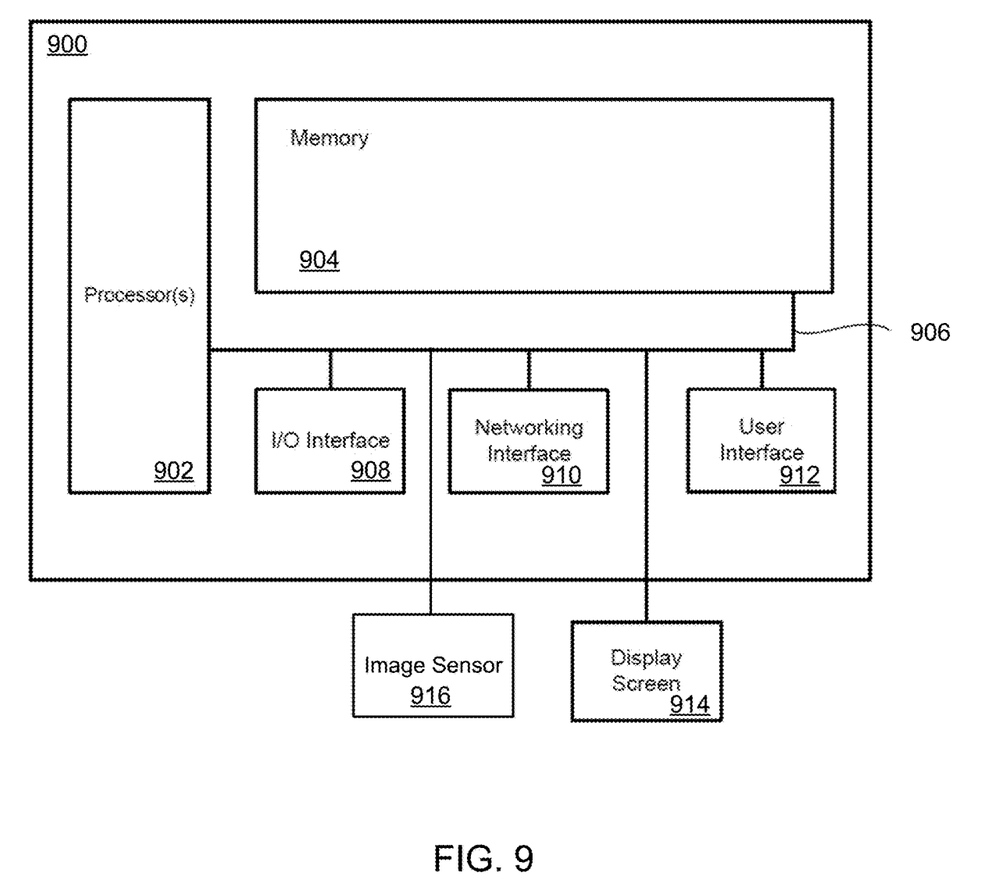
FIG. 9 illustrates a block diagram of an example computer system with an image sensor, in accordance with examples of the present disclosure.

FIG. 9 depicts an exemplary system 900 upon which embodiments of the present disclosure may be implemented. For example, the system of FIG. 9 may be a computer system or a component of an imaging system. The system can include a memory controller 902, a plurality of memory 904, a processor 906, and circuitry 908. The circuitry can be configured to analyze image data from an image sensor 916 and reconstruct an image as described herein. Various embodiments of such systems for FIG. 9 can include smart phones, laptop computers, handheld and tablet devices, CPU systems, server systems, networking systems, storage systems, high capacity memory systems, or any other computational system.

The system can also include an I/O (input/output) interface 910 for controlling the I/O functions of the system, as well as for I/O connectivity to devices outside of the system. A network interface can also be included for network connectivity, either as a separate interface or as part of the I/O interface 910. The network interface can control network communications both within the system and outside of the system. The network interface can include a wired interface, a wireless interface, a Bluetooth interface, optical interface, and the like, including appropriate combinations thereof. Furthermore, the system can additionally include various user interfaces, display devices, as well as various other components that would be beneficial for such a system.

The system can also include memory in addition to memory 904 that can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The processor 906 can be a single or multiple processors, and the memory can be a single or multiple memories. The local communication interface can be used as a pathway to facilitate communication between any of a single processor, multiple processors, a single memory, multiple memories, the various interfaces, and the like, in any useful combination.

The system can also include a user interface 912 a graphical user interface for interacting with the user. The system can also include a display screen 914 for displaying images and the user interface 912. The system can also include the image sensor 916 for being exposed to light from an object. The image sensor 916 may be physically coupled to the system or may be physically remote from the system.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method for imaging an object, comprising:
   exposing an image sensor to light from an object without passing the light through an image modification element;
   recording light intensity from the light in a single capture and storing the light intensity as image data in a medium; and
   reconstructing the image data as a reconstructed image of the object, wherein the reconstructed image is a focused image of the object, and wherein the reconstructed image is a two-dimensional or three-dimensional image, wherein the reconstructing includes reconstructing the image data such that the reconstructed image is based on a reconstruction evaluation of the data combined with a space-variant point-spread function.

2. The method of claim 1, wherein the image sensor is a complementary metal-oxide-semiconductor (CMOS).

3. The method of claim 1, wherein the method further comprises processing the reconstructed image at the processor with binary thresholding to form an image of the object.

4. The method of claim 1, wherein the reconstruction evaluation for the reconstructed image employs a calibration matrix.

5. The method of claim 4, wherein the calibration matrix includes at least one of varied wavelength data, varied light intensity, and varied distance.

6. The method of claim 1, wherein the reconstructing includes applying deep learning on the image data such that the reconstructed image is a pattern recognition of an image characteristic of the image, wherein the image characteristic is at least one of color, facial recognition, motion, and shape.

7. The method of claim 1, wherein the exposing the light from the object at the image sensor is between 10 ms and 100 ms.

8. The method of claim 1, wherein a surface of the image sensor is engineered with scatterers.

9. The method of claim 1, wherein the medium for the storing the light is local to the image sensor.

10. The method of claim 1, wherein the medium for the storing the light is remote to the image sensor.

11. The method of claim 1, wherein the image modification element is a lens or an aperture.

12. The method of claim 1, wherein the light does not originate from a light source associated with the image sensor.

13. The method of claim 1, wherein the light is not coherent light.

14. The method of claim 1, wherein a distance between the object and the image sensor has a range of 85 to 497 millimeters.

15. A lensless imaging system for imaging an object, comprising:
    an image sensor configured to be exposed to light from an object without passing the light through an image modification element;
    a medium configured to record light intensity from the light in a single capture and store the light intensity as image data; and
    a processor configured to:
    reconstructing the image data as a reconstructed image of the object, wherein the reconstructed image is a focused image of the object, and wherein the reconstructed image is a two-dimensional or three-dimensional image, wherein the reconstructed image is based on a reconstruction evaluation of the data combined with a space-variant point-spread function.

16. The imaging system of claim 15, wherein the processor is further configured to process the reconstructed image at the processor with binary thresholding to form an image of the object.

17. The imaging system of claim 15, wherein the reconstruction evaluation for the reconstructed image employs a calibration matrix.

18. The imaging system of claim 15, wherein a different calibration matrix is employed for each distance between the object and the image sensor.

19. The imaging system of claim 15, wherein the reconstructing includes applying deep learning on the image data such that the reconstructed image is a pattern recognition of an image characteristic of the image, wherein the image characteristic is at least one of color, facial recognition, motion, and shape.

20. The imaging system of claim 15, wherein the image sensor is a complementary metal-oxide-semiconductor (CMOS).

21. The imaging system of claim 15, wherein a surface of the image sensor is engineered with scatterers.

22. The imaging system of claim 15, wherein the medium is local to the image sensor.

23. The imaging system of claim 15, wherein a surface of the image sensor is covered with a coating that is at least partially transparent to the light and the coating does not focus the light onto the image sensor.

24. The imaging system of claim 15, wherein the image modification element is a lens or an aperture.

* * * * *